US008234618B2

(12) United States Patent
Bose et al.

(10) Patent No.: US 8,234,618 B2
(45) Date of Patent: Jul. 31, 2012

(54) TRACE RECONSTRUCTION FOR SILICON VALIDATION OF ASYNCHRONOUS SYSTEMS-ON-CHIP

(75) Inventors: Mrinal Bose, Austin, TX (US); Jayanta Bhadra, Austin, TX (US); Hillel Miller, Austin, TX (US); Edward L. Swarthout, Austin, TX (US); Ekaterina A. Trofimova, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 388 days.

(21) Appl. No.: 12/611,156

(22) Filed: Nov. 3, 2009

(65) Prior Publication Data

US 2011/0107146 A1 May 5, 2011

(51) Int. Cl.
*G06F 17/50* (2006.01)
*G06F 11/00* (2006.01)
(52) U.S. Cl. ............ 716/136; 716/51; 716/52; 716/106; 716/112; 714/32; 714/33
(58) Field of Classification Search .................... 716/51, 716/52, 106, 111, 112, 136; 714/32, 33, 714/45, 729, 734
See application file for complete search history.

(56) References Cited

U.S. PATENT DOCUMENTS

2005/0256655 A1* 11/2005 Iwasa ............................. 702/35

* cited by examiner

*Primary Examiner* — Vuthe Siek
(74) *Attorney, Agent, or Firm* — Van Leeuwen & Van Leeuwen; Joanna Chiu

(57) ABSTRACT

A test system collects passing event data and failing event data, and merges the collected data into passing subsequences and failing subsequences, respectively. The test system identifies an overlap area between the passing subsequence and the failing subsequence in regards to time slices and tracepoint slices, and creates passing transactions and failing transactions using the event data corresponding to the overlap area. Next, the test system detects a timing discrepancy between the first passing transaction relative to the second passing transaction compared with the first failing transaction relative to the second failing transaction. The test system then reports the detected timing discrepancy, which allows a test engineer to perturb the test program in order to more frequently catch intermittent failures caused by asynchronous timing conditions.

20 Claims, 12 Drawing Sheets

TRACE RECONSTRUCTION FOR SILICON VALIDATION OF ASYNCHRONOUS SYSTEMS-ON-CHIP

TECHNICAL FIELD

The present disclosure relates to a system and method for resolving intermittent asynchronous device failures. More particularly, the present disclosure relates to identifying timing discrepancies between event data captured when a test program passes and event data captured when the same test program fails.

BACKGROUND

Complex devices, such as a system-on-a-chip, typically include multiple clock signals that are not necessarily synchronous with each other due to clock fan-out delays. As a result, circuitry in one section of the device may be asynchronous to circuitry in another section of the device. When data and/or signals cross between the two sections, intermittent asynchronous issues may occur. These issues may propagate in the device and not cause a failure until a later point in time.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
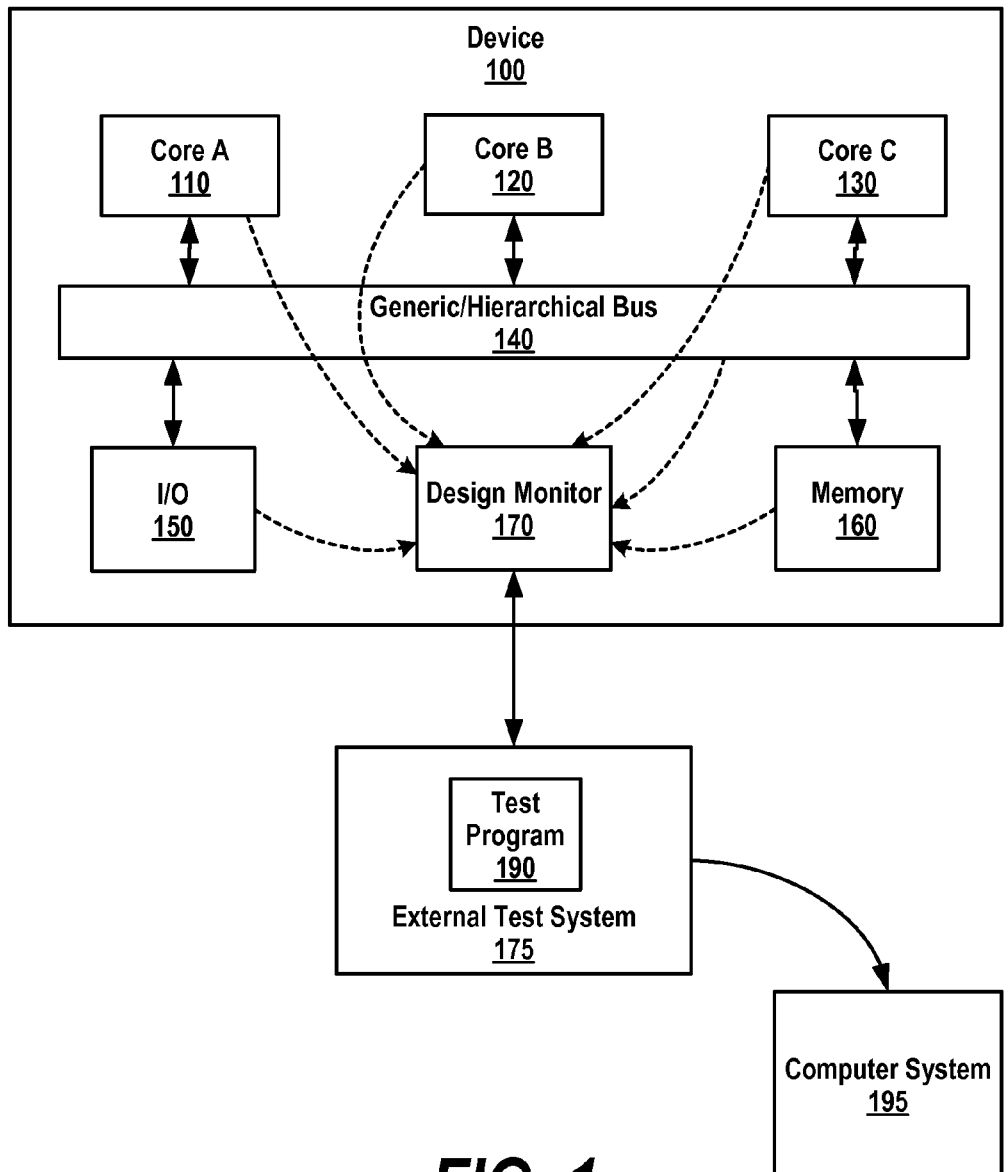
FIG. 1 is a diagram example showing a test system collecting and analyzing event data from a device, such as a system-on-a-chip, which operates off of multiple asynchronous clock signals.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The following detailed description further explains and expands the definitions of the various aspects and embodiments of the disclosure as necessary.

FIG. 1 is a diagram example showing a test system collecting and analyzing event data from a device, such as a systemon-a-chip, that operates off of multiple asynchronous clock signals. Device 100 includes cores 110-130, generic hierarchical bus 140, input/output block 150, memory 160, and design monitor 170. As one skilled in the art can appreciate, device 100 may have a different configuration (e.g., more or less cores, etc.) than what is shown in FIG. 1.

Internally, device 100 utilizes multiple clocks to function, such as each core utilizing a different clock to execute tasks. As a result, portions of device 100 operate asynchronous to other portions of device 100. This asynchronous nature may intermittently mask failures during silicon debug, silicon validation, and/or field operation due to race conditions between various circuitries. These race conditions are difficult to troubleshoot because they occur intermittently and, in turn, two different transactions may result in either a passing test or a failing test based upon when they occur in relation to each other (see FIG. 11 and corresponding text for further details).

When device 100 fails, either in the field, on the manufacturing line, or during silicon validation and verification, a test engineer may utilize test system 175 in conjunction with design monitor 170 to debug the intermittent asynchronous failure. Design monitor 170 is internal to device 100 and couples to external test system 175 to provide event data using, for example, a packet-based protocol. This protocol may be JTAG (IEEE 1149.1) or, for high-speed systems, device 100 may include an auxiliary port that supports full duplex, higher bandwidth transfers.

Design monitor 170 is configured by external test system 175 to monitor and capture event data from device 100's components. In one embodiment, design monitor 170 captures event data in increments due to design monitor 170's throughput limitations. As such, external test system 175 programs design monitor 170 to capture event data in "time-tracepoint slices," which captures event data in time slices and tracepoint slices. A tracepoint slice includes a subset of tracepoints, or "design points," that reside on a device. Each tracepoint allows a design monitor to capture a state of an element of the device at a given time during program execution, such as a bus, a signal, a memory location, a register, and etcetera. The tracepoint associated with a bus may be a tuple of the values in its address lines, data lines and transaction type. A time slice is a subset of time of the total execution time of a test program. For example, device 100 may include 1,000 tracepoints to monitor and a test program may execute for 1,000 cycles. In this example, design monitor 170 may be programmed to capture time-tracepoint slice event data in 100 point/100 cycle increments due to design monitor 170's memory limitations. External test system 175 configures the time-tracepoint slices to overlap each other on a time continuum and a tracepoint continuum. For example, from a tracepoint continuum, one time-tracepoint slice may capture event data from tracepoints 1-100 for the first 100 cycles and the next time-tracepoint slice may capture event data from tracepoints 90-190 for the same first 100 cycles. In a time continuum, for example, one time-tracepoint slice may capture event data from clock cycles 1-100 and the next time-tracepoint slice may capture event data from clock cycles 90-190 for the same tracepoints. Time-tracepoint slices overlap in order to merge the corresponding time-tracepoint slice event data during an event stitching stage (see FIGS. 9-10, and corresponding text for further details).

Once external test system 175 identifies time-tracepoint slices, test system 175 programs design monitor 170 to capture corresponding event data, and then executes test program 190. Test program 190 is a representation of a test that device 100 previously failed. For example, test program 190 may be a silicon verification test, a manufacturing test, or a test that simulates conditions when device 100 failed in a field environment. In one embodiment, external test system 175 may not invoke test program 190 to device 100, but rather allow device 100 to operate in the field environment, all the while capturing the event data. External test system 175 repeatedly reprograms design monitor 170 and re-executes test program 190 in order to capture event data for different time-tracepoint slices. Note that the same test program 190 executes, but design monitor 170 captures event data at different tracepoints and different times during test program 190's repeated re-execution.

Once external test system 175 captures event data for each time-tracepoint slice, external test system may analyze the data or, in one embodiment, external test system 175 downloads the event data to computer system 195 for further analysis. For example, external test system 175 may download the event data to computer system 195, which subsequently analyzes the event data and identifies a root cause of the intermittent asynchronous failure. Analysis includes "stitching" together time-tracepoint slice event data into passing subsequences and failing subsequences; identifying transactions that lie within an overlapping area between passing subsequences and failing subsequences; and identifying timing discrepancies between transactions that lie within the overlapping area (see FIGS. 3-11 and corresponding text for further details). Note that external test system 175 may be configured to perform functions or steps that are discussed herein as computer system 195 (or the computer system) performing such functions or steps (or vice versa).

Figure 2:
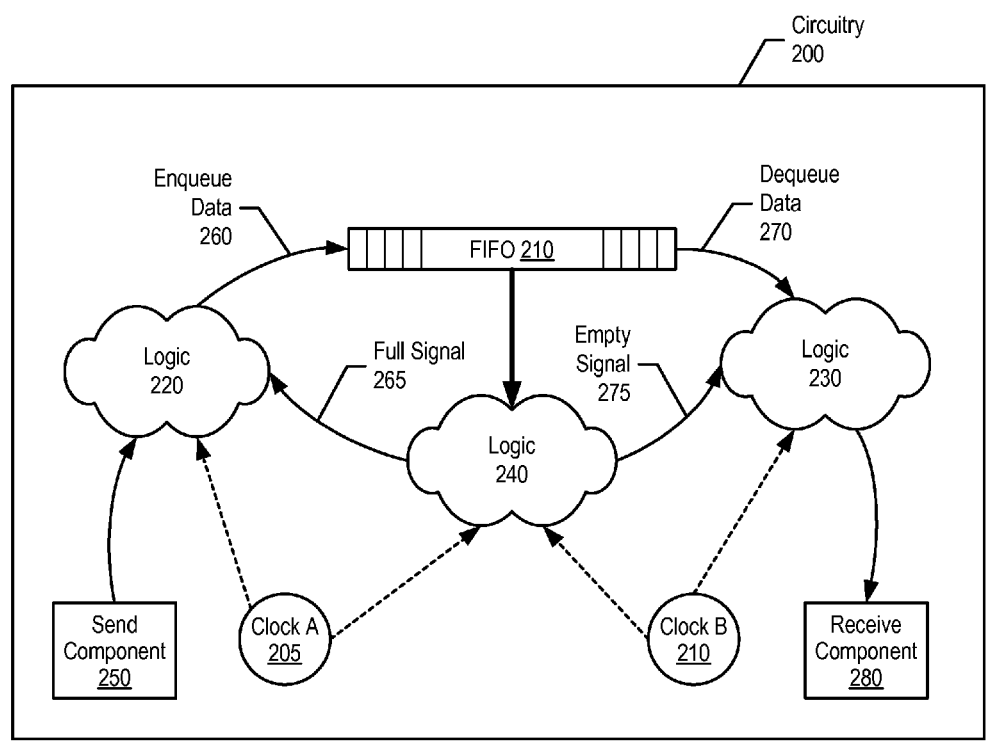
FIG. 2 is a diagram example showing device circuitry operating off of two different clock signals.

FIG. 2 is a diagram example showing device circuitry operating off of two different clock signals and creating intermittent asynchronous failure conditions within the device. Circuitry 200 includes send component 250 and receive component 280, which operate in different clock domains. Send component 250 couples to logic 220, which operates in clock A 205's clock domain. Receive component 280 couples to logic 230, which operates in clock B 210's clock domain. Since logic 220 and 230 do not operate in the same clock domain, their actions are not synchronized with each other.

Logic 220 may reside on a different core or a different bus than logic 230. For example, logic 220 may reside on core A 110 (shown in FIG. 1) and logic 230 may reside on a PCI bus (included in I/O 150 shown in FIG. 1). In another example, logic 220 resides on core A 110 and logic 230 resides on core B 120. In one embodiment, logic 220 and logic 230 may reside on separate buses, such as a PCI bus and a Rapid I/O bus, respectively.

Send component 250 provides information to logic 220 that, in turn, sends enqueue data 260 to FIFO (first-in-first-out) queue 210. FIFO 210 may be a shared resource, for example, attached to a common bus (e.g., generic/hierarchical bus 140 shown in FIG. 1). Logic 240 monitors FIFO 210 and informs logic 220 and logic 230 when FIFO 210 is full or empty. When logic 240 detects FIFO 210 is full, logic 240 sends full signal 265 to logic 220 to stop sending enqueue data 260. In turn, logic 220 stops sending enqueue data 260 to FIFO 210 so that FIFO 210 data is not over-written.

On the receive side, logic 230 receives dequeue data 270 from FIFO 210. When logic 240 detects FIFO 210 is empty, logic 240 sends empty signal 275 to logic 230, thus preventing receive component 280 from receiving invalid data from FIFO 210.

When logic 240 is not functioning properly, thus causing full signal 265 and/or empty signal 275 to not function properly, logic 220 may attempt to provide enqueue data 260 to FIFO 210 even when FIFO 210 is full, thus loosing data and eventually causing a device failure. The lost data, however, may not cause issues until later in a computer program's execution, which makes troubleshooting difficult. A design monitor, such as design monitor 170 shown in FIG. 1, is able to capture event data corresponding to enqueue data 260 and dequeue data 270. The design monitor, however, may not be able to capture event data from full signal 265 and empty signal 275 because of practical limitations to monitor every possible signal on a device. For example, providing the ability to monitor every possible signal on a device may require unacceptable design overhead in terms of device size or power consumption. Full signal 265 and empty signal 275 are a function of the state of FIFO 210 and may not represent data moving in and out of FIFO 210. In turn, these signals may be considered too insignificant to include as tracepoints when designing a device. As such, a computer system analyzes event data (enqueue data 260 and dequeue data 270) in both passing situations and failing situations in order to identify the root cause of an intermittent asynchronous failure.

Figure 3:
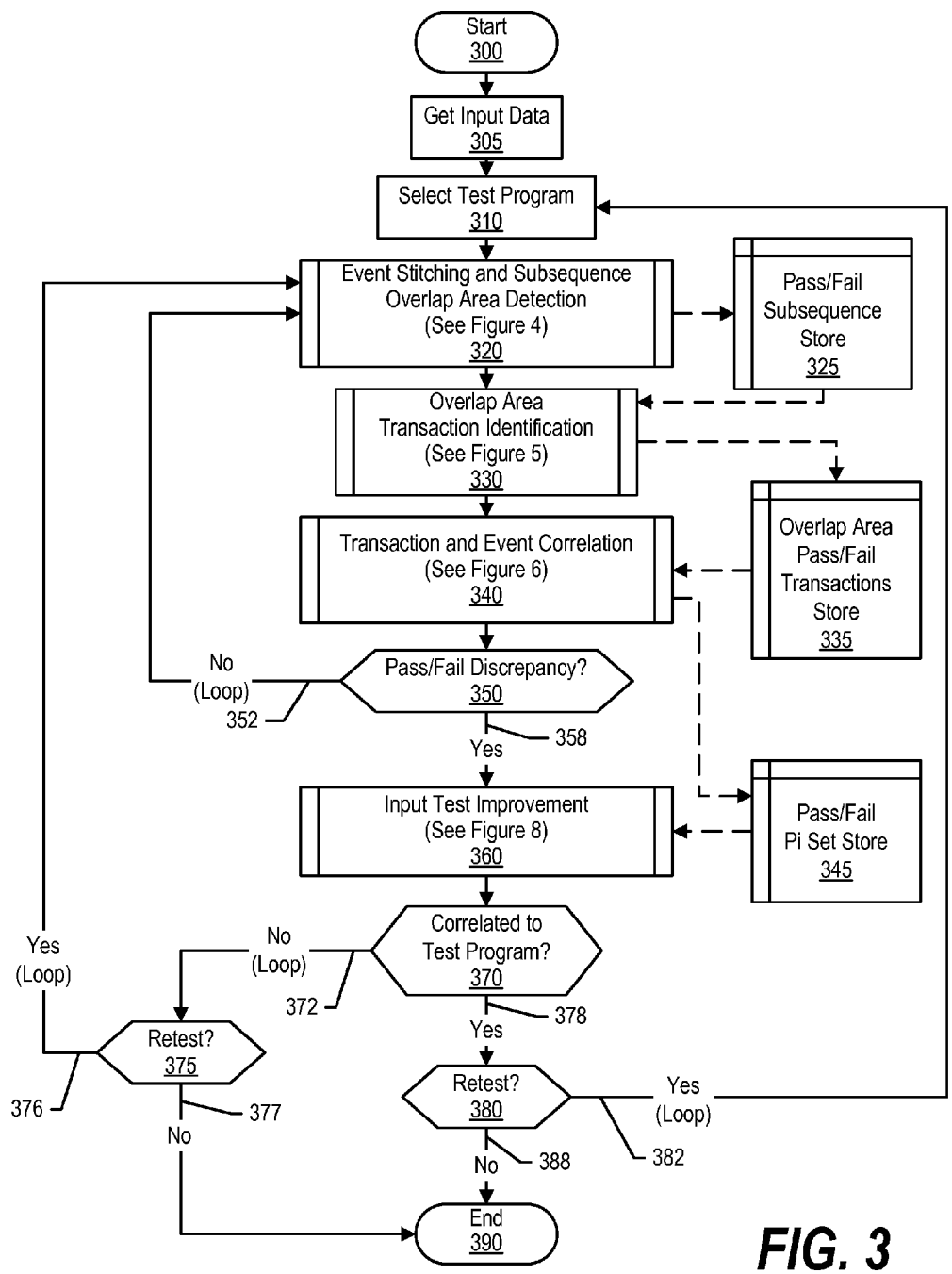
FIG. 3 is a high-level flowchart example showing steps taken in identifying causes of intermittent test failures that occur on an asynchronous device.

FIG. 3 is a high-level flowchart example showing steps taken in identifying intermittent asynchronous test failure causes that occur on a device. Processing commences at 300, whereupon a test system gathers input data corresponding to a device's intermittent failing condition (step 305). For example, input data may include a test program that causes the intermittent failure during silicon verification, or the input data may correspond with a field condition that caused the device to fail.

At step 310, the test system selects a test program (e.g., test program 190 shown in FIG. 1) that caused the intermittent asynchronous failure. The test system repetitively tests the device using the test program while capturing time-tracepoint slice event data at various tracepoints on the device and at various times within the test program based upon predetermined time-tracepoint slices. The test system then "stitches" together (merges) passing event data into passing subsequences, and stitches together failing event data into failing subsequences, which are both stored in pass/fail subsequences store 325 (pre-defined process block 320, see FIG. 4 and corresponding text for further details). Pass/fail subsequence store 325 may be stored on a nonvolatile or volatile storage area, such as a computer hard drive or computer memory.

The test system may utilize an internal design monitor, such as design monitor 170 shown in FIG. 1, to capture the time-tracepoint slice event data. In one embodiment, the test system programs the design monitor to monitor particular locations within the device while the test program executes. In this embodiment, prior to a subsequent retest, the test system reprograms the design monitor to monitor different locations. As such, the test system obtains different time-tracepoint slice event data for each repetitive test (see FIG. 8 and corresponding text for further details). In turn, the test system merges the time-tracepoint slice event data into the passing subsequences and the failing subsequences (based upon whether the test passed or failed when the time-tracepoint slice event data was gathered). In one embodiment, the test system collects the test data and sends the time-tracepoint slice event data to a different computer system to analyze the data. As described herein, steps executed by a test system may also be executed by a different computer system.

Figure 5:
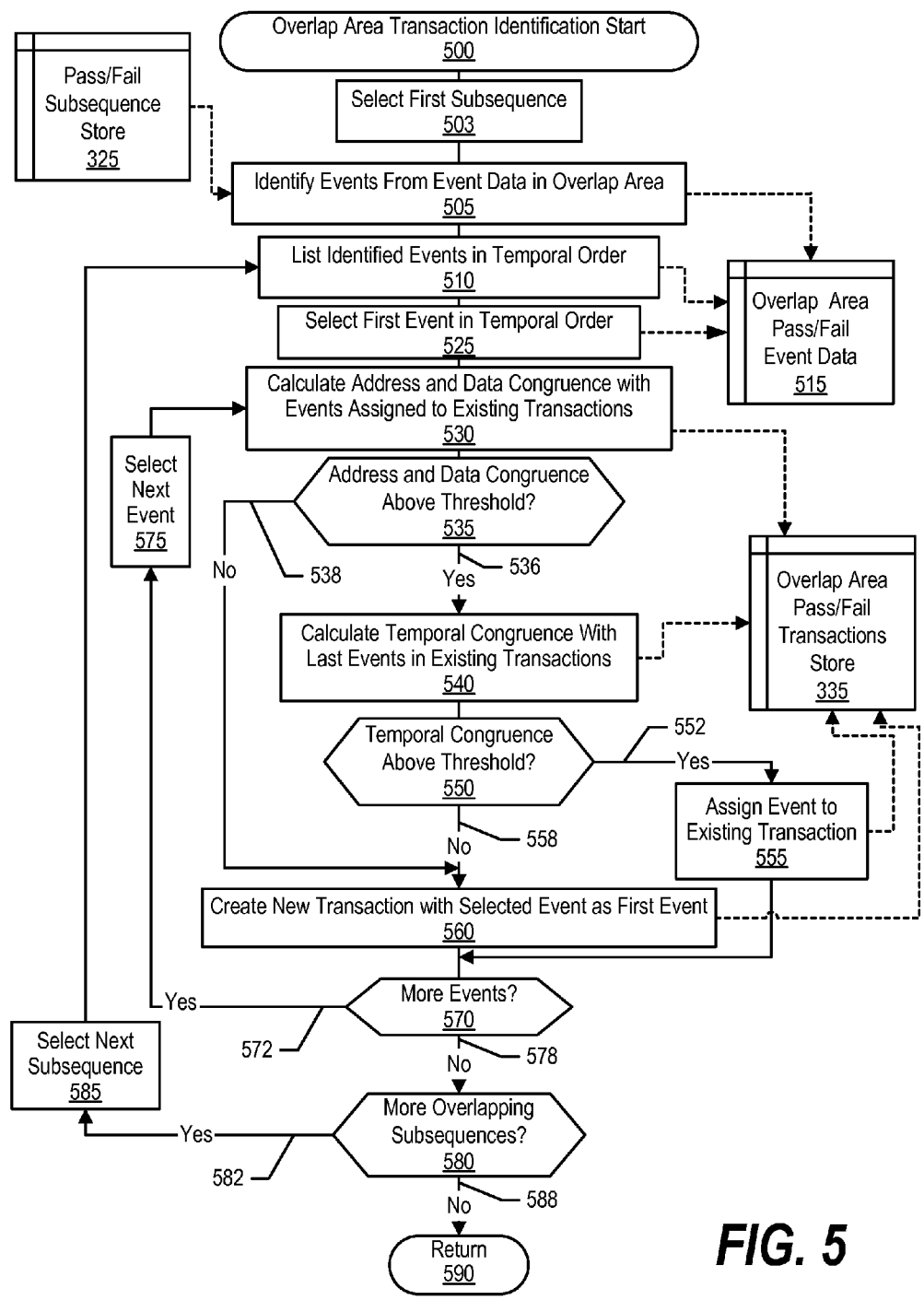
FIG. 5 is a flowchart example showing steps taken in grouping events into transactions that are within an overlapping area between a passing subsequence and a failing subsequence.

Once the time-tracepoint slice event data is stitched together into passing subsequences and failing subsequences, the test system identifies an overlap area between a passing subsequence and a failing subsequence, and links events together as passing transactions and failing transactions, respectively, which are included in the overlap area (pre-defined process block 330, see FIG. 5 and corresponding text for further details). For example, when a processor executes a "FETCH" command, the FETCH command invokes multiple events at the processor and system bus. In this example, these events are linked together as a transaction. The test system stores the passing transactions and failing transactions corresponding to the overlap area in overlap area pass/fail transactions store 335. Overlap area pass/fail transactions store 335 may be stored on a nonvolatile or volatile storage area, such as a computer hard drive or computer memory.

Figure 6:
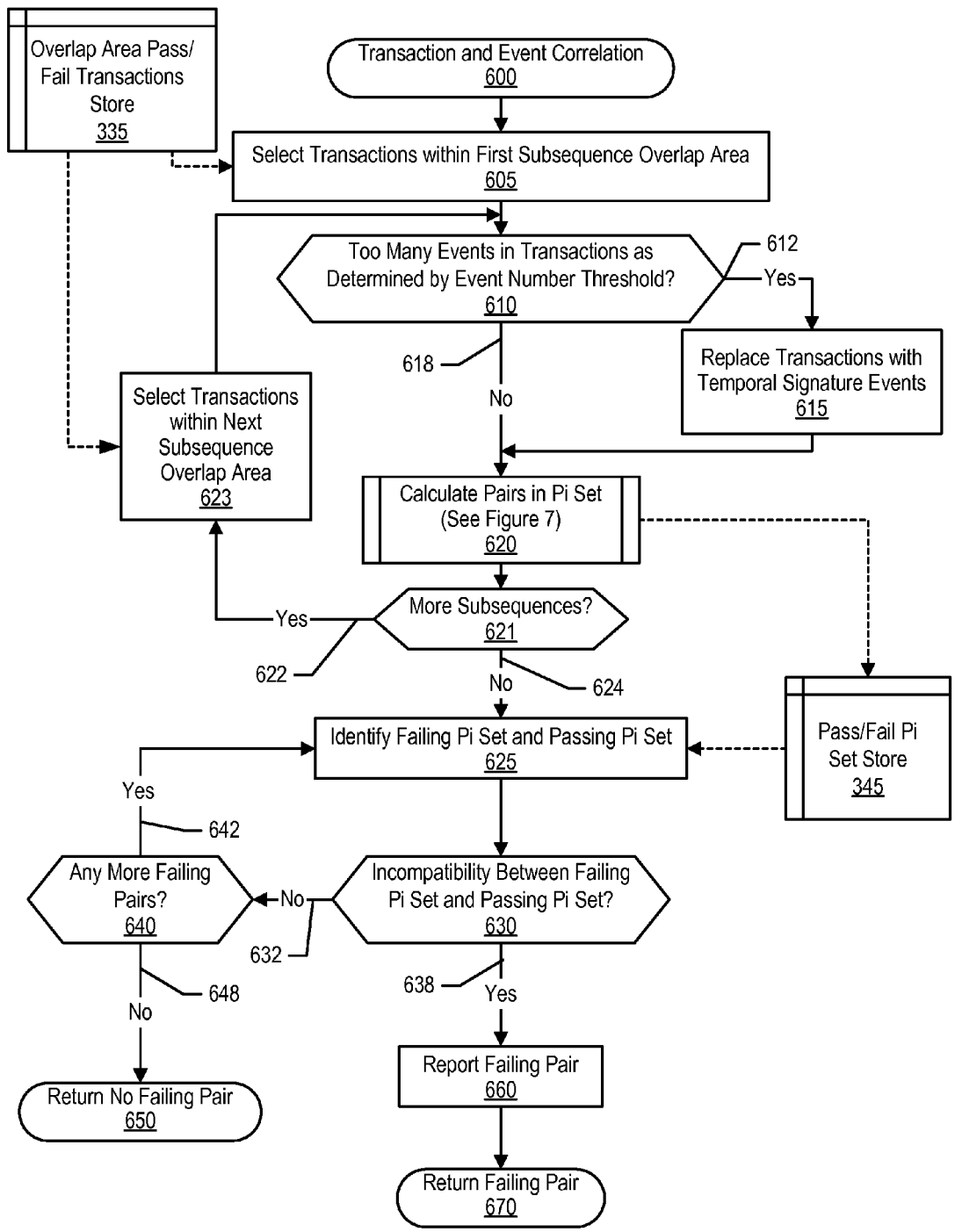
FIG. 6 is a flowchart example showing steps taken in correlating transactions and event data when a test passes with transactions and event data when the same test fails.

Next, the test system correlates the passing transactions with failing transactions, and identifies timing order discrepancies between events included in the passing transactions versus the failing transactions by identifying event pairs that are not part of a same transaction and storing the event pairs in pass/fail Pi set store 345 (pre-defined process block 340, see FIG. 6 and corresponding text for further details). The discrepancies may result from nonfunctioning combinational logic that manages data flow between two asynchronous components (e.g., combinational logic 240 shown in FIG. 2). Pass/fail Pi set store 345 may be stored on a nonvolatile or volatile storage area, such as a computer hard drive or computer memory.

In one embodiment, the discrepancies may identify event orders that put more "stress" on the device's circuits. For example, digital circuits define "ones" and "zeros" as voltage levels. When a signal is transmitted or data is stored, the voltage level takes a small but finite period of time to be established. As such, certain event orders may cause the voltage level to be used before it is established, or may delay the stabilization of the voltage level. This may be alleviated by design changes, such as a larger sized transistor.

A determination is made as to whether there is an event timing discrepancy between the passing transactions and the failing transactions (decision 350). For example, the test system may have identified events that result in a passing test when they occur in one time sequence, but result in a failing test when they occur in a different time sequence (see FIG. 11 and corresponding text for further details). If the test system did not identify a pass/fail discrepancy, decision 350 branches to "No" branch 352, which loops back to retest the device and collect more event data.

On the other hand, if the test system identified a pass/fail discrepancy, decision 350 branches to "Yes" branch 358, whereupon the test system analyzes the discrepancy and attempts to modify a device's test program accordingly in order to identify devices during production testing that exhibit this failure mode. In one embodiment, a hardware designer may map the discrepancy to RTL (register transfer language) in order to modify the device's design and correct the design issue altogether, such as adding a buffer to alleviate a race condition (pre-defined process block 360, see FIG. 8 and corresponding text for further details).

A determination is made as to whether the test system was able to correlate the discrepancy to the device's test program (decision 370). For example, if a passing or failing subsequence does not extend towards an initial time period of the test run, it may not be feasible for the test system to correlate the discrepancy all the way back to the test program. If the test system was not able to correlate the discrepancy to the device's test program, decision 370 branches to "No" branch 372, whereupon a determination is made as to whether to retest the device (decision 375). For example, a test engineer may wish to stop the test and place the device in different environment conditions (e.g., burn-in oven) and resume testing at a later time. If the device should be retested, decision 375 branches to "Yes" branch 376, which loops back and retests the device and gathers event data. This looping continues until the test system should stop testing the device, at which point decision 375 branches to "No" branch 377, whereupon processing ends at 390.

Referring back to decision 370, if the test system correlated the discrepancy to the device's test system, decision 370 branches to "Yes" branch 378, whereupon a determination is made as to whether to retest the device using the revised test program in order to determine whether the revised test program catches the race condition discrepancy (decision 380). If the test system should retest the device using the revised test program, decision 380 branches to "Yes" branch 382, whereupon processing loops back to load the revised test program and retest the device. At this point the device should fail more often if the test program was revised properly.

On the other hand, if the device should not be tested using the revised test, decision 380 branches to "No" branch 388 whereupon processing ends at 390.

Figure 4:
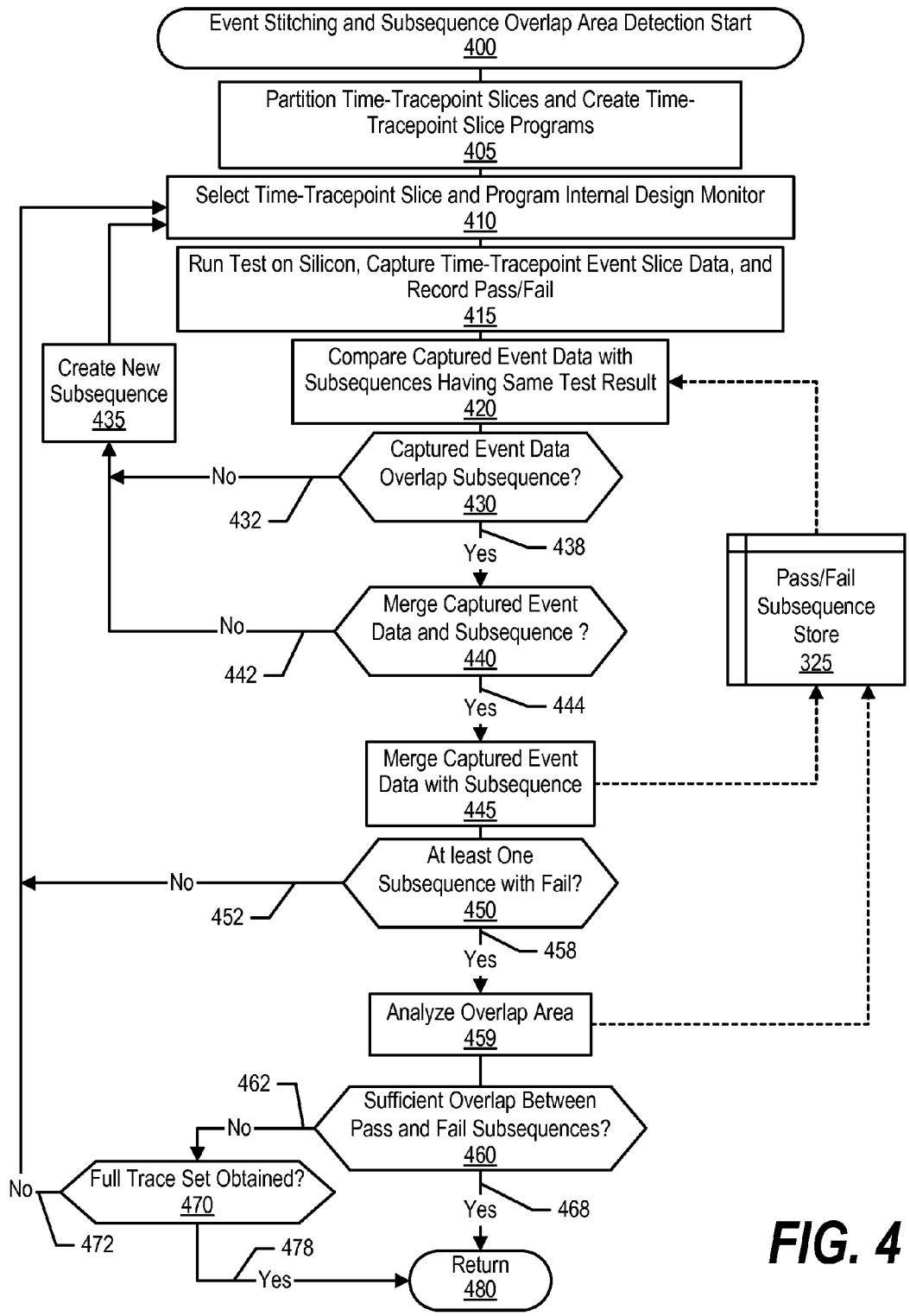
FIG. 4 is a flowchart example showing steps taken in capturing time-tracepoint slice event data based upon time-tracepoint slices, and merging the time-tracepoint slice event data into subsequences.

FIG. 4 is a flowchart example showing steps taken in merging event data into subsequences and identifying an overlap area between passing subsequences and failing subsequences. A test system defines the time-tracepoint slices for particular tracepoints at particular timeframes of a test program. The test system then repeatedly executes a test program and programs an internal design monitor to individually capture time-tracepoint slice event data for each time-tracepoint slice for each re-execution.

Processing commences at 400, whereupon the test system partitions time-tracepoint slices and creates time-tracepoint slice programs at step 405. A time-tracepoint slice defines 1) a subset of a total number of traceable tracepoints which can be monitored at the same time and 2) a subset of time of a total execution time that a test program takes to execute. Each time-tracepoint slice is utilized to program the internal design monitor to capture event data for a particular time-tracepoint slice. The time-tracepoint slices overlap in a time continuum and tracepoint continuum in order to identify and merge corresponding time-tracepoint slice event data into subsequences (see FIG. 8 and corresponding text for further details).

At step 410, the test system selects a time-tracepoint slice and programs the internal design monitor using a corresponding time-tracepoint slice program. Next, the test system executes a test program on the device, all the while the internal design monitor captures event data based upon the programmed time-tracepoint slice program (step 415).

At step 420, the test system compares the captured event data with subsequences having the same result (pass or fail), which are included in pass/fail subsequence store 325. Subsequences are "stitched together" time-tracepoint slice event data whose time-tracepoint slices overlap each other and result in a similar pass/fail test outcome in step 415 (see FIG. 8 and corresponding text for further details). A determination is made as to whether the recently captured time-tracepoint slice event data is consistent with an existing subsequence (decision 430). If the recently captured time-tracepoint slice event data does not overlap, decision 430 branches to "No" branch 432, whereupon the test system creates a new subsequence with the recently captured time-tracepoint slice event data and identifies the subsequence as either a passing subsequence or a failing subsequences based upon the test result of step 415 (step 435). Processing then selects another time-tracepoint slice for which to capture time-tracepoint slice event data at step 410.

On the other hand, if the recently captured time-tracepoint slice event data overlaps with a subsequence, decision 430 branches to "Yes" branch 438, whereupon a determination is made as to whether the time-tracepoint slice event data can be merged with the overlapping subsequence based upon their pass/fail outcomes and consistent shared characteristics (decision 440). For example, if the captured event data completely overlaps in time with a subsequence and partially overlaps in terms of events, each of the common events between the captured event data and the subsequence must have the same value and occur in the same order in order to be classified as consistent. Likewise, if the captured data shares all the events with the subsequence and has a partial overlap in time, all the events of the captured data and the subsequence that occur in the common time interval must have the same value. If two subsequences cannot be merged, decision 440 branches to "No" branch 442, which loops back to create a new subsequence and identifies the new subsequence as either a passing subsequence or a failing subsequence.

On the other hand, if the subsequences can be merged, decision 440 branches to "Yes" branch 444, whereupon the test system merges the time-tracepoint slice event data with the overlapping subsequence at step 445. Next, a determination is made as to whether at least one subsequence corresponds to a failed test (decision 450). If no subsequences correspond to a failed test, decision 450 branches to "No" branch 452, whereupon processing loops back to select a different time-tracepoint slice and capture time-tracepoint slice event data at step 410.

On the other hand, if at least one subsequence corresponds to a failing test, decision 450 branches to "Yes" branch 458, whereupon the test system analyzes an overlap area between the passing subsequences and failing subsequences (step 459). A determination is made as to whether sufficient overlap exists between a passing subsequence and a failing subsequence (decision 460). If there is sufficient overlap between the passing subsequence and the failing subsequence, decision 460 branches to "Yes" branch 468 whereupon processing returns at 480 to process the overlap area. On the other hand, if sufficient overlap does not exist, decision 460 branches to "No" branch 462 whereupon a determination is made as to whether a full trace set is obtained (e.g., a passing subsequence encompasses all time-tracepoint slices) (decision 470). If a full trace set has not been obtained, decision 470 branches to "No" branch 472, whereupon processing loops back to select and process a different time-tracepoint slice at step 410. On the other hand, if a full trace set is obtained, decision 470 branches to "Yes" branch 478 whereupon processing returns at 480.

FIG. 5 is a flowchart example showing steps taken in grouping events into transactions that are within an overlapping area between a passing subsequence and a failing subsequence. Processing commences at 500, whereupon the test system selects a first subsequence at step 503. At step 505, the test system identifies events from event data included in the subsequence that correspond to the overlap area, and stores the identified events in overlap area pass/fail event data 515. In one embodiment, one passing subsequence may overlap a failing subsequence. In another embodiment, multiple passing subsequences may overlap multiple failing subsequences. By utilizing all event data in overlapping subsequences (passing subsequences and failing subsequences), the test system is able to effectively identify root causes of intermittently occurring failures due to asynchronous behavior. Overlap area pass/fail event data 515 may be stored on a volatile or nonvolatile storage area, such as computer memory or a computer hard drive.

At step 510, the test system lists the identified events in temporal order, and selects the first temporal-ordered event at step 525 and, at step 530, the test system calculates address and data congruence with events that are already assigned to existing transactions for the selected subsequence, which are stored in overlap area pass/fail transactions store 335 (no existing transactions exist at this point in the first iteration through the flowchart).

A determination is made as to whether the address and data congruence are above an address/data congruence threshold (decision 535). For example, an address/data congruence threshold may configured to be a cache-line in width and, in this example, addresses within a cache-line of each other are considered part of the same transaction, even though they may not be identical. If the address and data congruence are not above the threshold, decision 535 branches to "No" branch 538 whereupon processing creates a new transaction with the selected event as the first event in the transaction (step 560) and processes a next event. On the other hand, if the address and data congruence are above the threshold, decision 535 branches to "Yes" branch 536. At step 540, the test system calculates a temporal congruence with the last events that are included in existing transactions to determine whether the selected event is part of an existing transaction (again, no existing transactions exist at this point in the first iteration through the flowchart).

A determination is made as to whether the temporal congruence is above a threshold (decision 550). In one embodiment, a threshold may be set that specifies a given number of "time-difference" microseconds. In this embodiment, if the time difference between the events is greater than that threshold, they are considered to belong to different transactions. The threshold may also be defined in terms of number of times a clock signal goes high between the two events. If the temporal congruence is above a threshold, decision 550 branches to "Yes" branch 552 whereupon the test system assigns the selected event to the corresponding existing transaction. On the other hand, if the temporal congruence is not above the threshold, decision 550 branches to "No" branch 558 whereupon the test system creates a new transaction with the selected event as the first event of the new transaction (step 560).

A determination is made as to whether there are more events to process for the selected subsequence in the overlap area (decision 570). If there are more events to process, decision 570 branches to "Yes" branch 572, whereupon the test system loops back to select (step 575) and process the next event in temporal order. This looping continues until there are no more events to process for the selected subsequence in the overlap area, at which point decision 570 branches to "No" branch 578.

A determination is made as to whether there are more subsequences to process that reside in the overlap area (decision 580). If there are more subsequences to process, decision 580 branches to "Yes" branch 582, whereupon the test system loops back to select (step 585) and process the next subsequence. This looping continues until there are no more subsequences to process, at which point decision 580 branches to "No" branch 588 whereupon processing returns at 590.

FIG. 6 is a flowchart example showing steps taken in correlating event data taken when a test passes to event data taken when the same test fails. Processing commences at 600, whereupon the test system selects transactions corresponding to the overlap area of the first subsequence located in overlap area pass/fail transactions store 335 (step 605). A determination is made as to whether the overlap includes too many events based upon an event number threshold (decision 610). For example, a large overlapping region may have millions of points. Comparing these events pair-wise may be computationally expensive. If too many events exist, decision 610 branches to "Yes" branch 610, whereupon the test system replaces transactions with temporal signatures at 615 in order to reduce computational overhead. For example, temporal signatures may include a first, last, and median event, and may also include first and third quartile events. On the other hand, if there are not too many events to process, decision 610 branches to "No" branch 618.

The test system proceeds through a series of steps to calculate "Pi" sets for passing subsequences and failing subsequences from the overlapped transactions. The Pi sets represents event pairs (A, B) such that A occurs before B, but have been identified as not belonging to the same transaction. The Pi sets are stored in pass/fail Pi set store 345 (pre-defined process block 620, see FIG. 7 and corresponding text for further details).

A determination is made as to whether there are more subsequences to process (decision 621). If there are more subsequences to process, decision 621 branches to "Yes" branch 622, whereupon the test system selects transactions corresponding to the overlap area of the next subsequence (step 623). After each subsequence included in the overlap area is processed, decision 621 branches to "No" branch 624.

At step 625, the test system identifies a failing Pi set and a passing Pi set included in pass/fail Pi set store 345, and a determination is made as to whether an incompatibility exists between the passing Pi set and the failing Pi set (decision 630). In one embodiment, this may determined via a "SAT" (Boolean satisfiability problem) solver. As an example of incompatibility, pair (A, B) exists in a failing Pi set and Pair (B, A) exists in a passing Pi set. This incompatibility represents a timing order discrepancy between the passing and the failing transaction. If such a discrepancy exists, the test system identifies the discrepancy as an early symptom and a possible cause of a failure (the root cause may have occurred earlier in the test) of the intermittent asynchronous failure condition, and decision 630 branches to "Yes" branch 640 whereupon processing reports the failing pair at 660 (e.g., reports to an RTL designer) and returns at 670.

On the other hand, if no discrepancy exists between the failing set and the passing set, decision 630 branches to "No" branch 640 whereupon a determination is made as to whether there are any more failing Pi sets (decision 640). If there are more failing Pi sets, decision 640 branches to "Yes" branch 642, which loops back and the test system identifies a different failing Pi set and a corresponding overlapping passing Pi set. This looping continues until there are no more failing Pi sets to analyze, at which point decision 640 branches to "No" branch 648 whereupon processing returns at 650.

Figure 7:
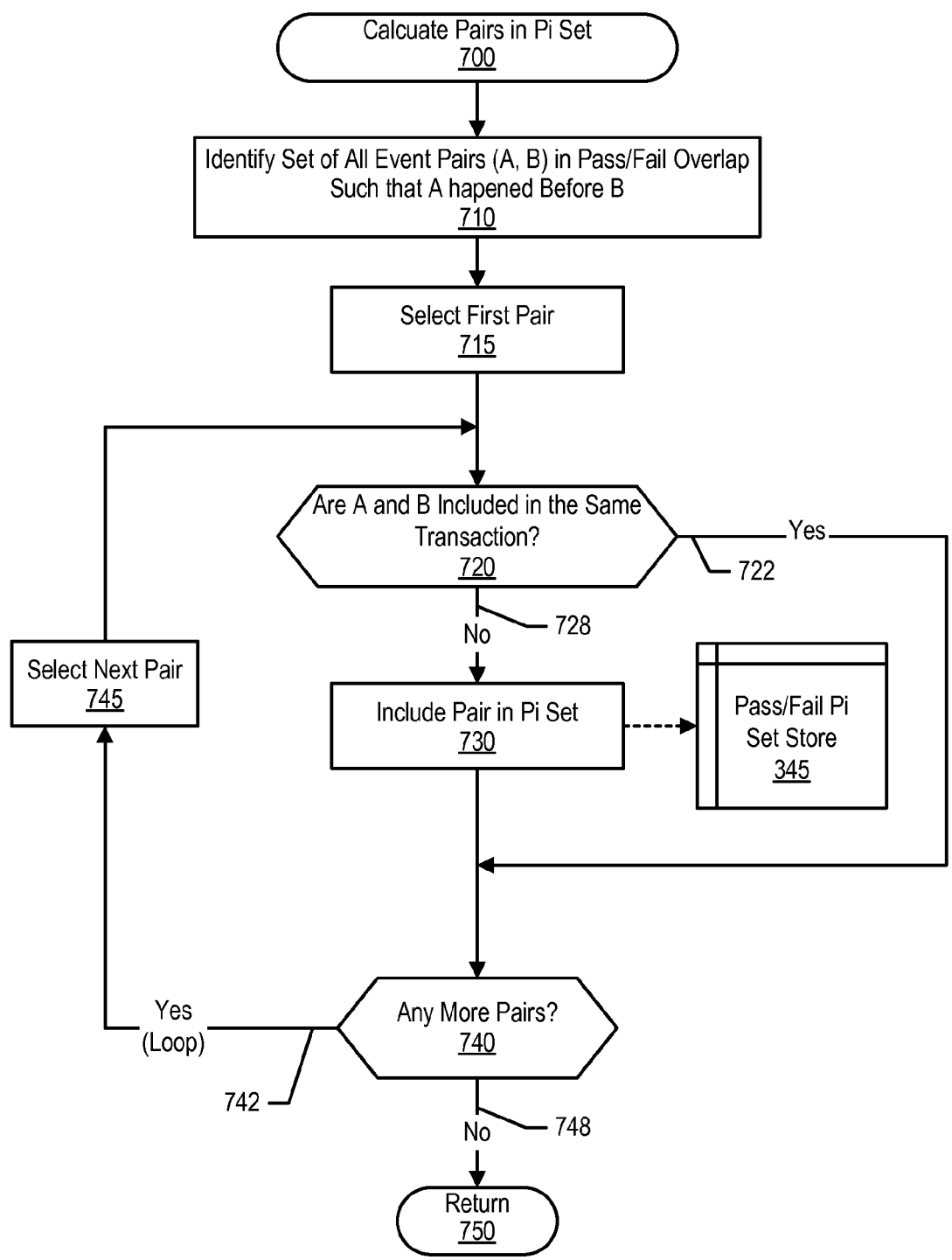
FIG. 7 is a flowchart example showing steps taken in correlating passing transaction event pairs to failing transaction event pairs.

FIG. 7 is a flowchart example showing steps taken in including event pairs into a Pi set. Processing commences at 700, whereupon the test system identifies sets of event pairs included in the pass/fail overlap area such that event "A" happened before event "B" (step 710). At step 715, the test system selects the first pair, and a determination is made as to whether event A and event B are part of the same transaction (A caused B) (decision 720). When event A causes event B, the temporal correlation between the two remains constant (A always before B) and, therefore, these two events will not cause an intermittent asynchronous failure. As such, when event A and event B are included in the same transaction, decision 720 branches to "Yes" branch 722, bypassing step 730.

On the other hand, if event A and event B are part of different transactions (A does not cause B), decision 720 branches to "No" branch 728 whereupon the test system stores the event pair in the Pi set located in pass/fail Pi set store 345 at step 730. The Pi set includes potential asynchronous events that may cause intermittent failures. These sets are analyzed in FIG. 6 to identify which one (or more) of the pairs are incompatible between the passing and the failing set.

A determination is made as to whether there are any more event pairs to process (decision 740). If there are more event pairs to process, decision 740 branches to "Yes" branch 742, which loops back to select (step 745) and process the next event pair. This looping continues until there are no more event pairs to process, at which point decision 740 branches to "No" branch 748 whereupon processing returns at 750.

Figure 8:
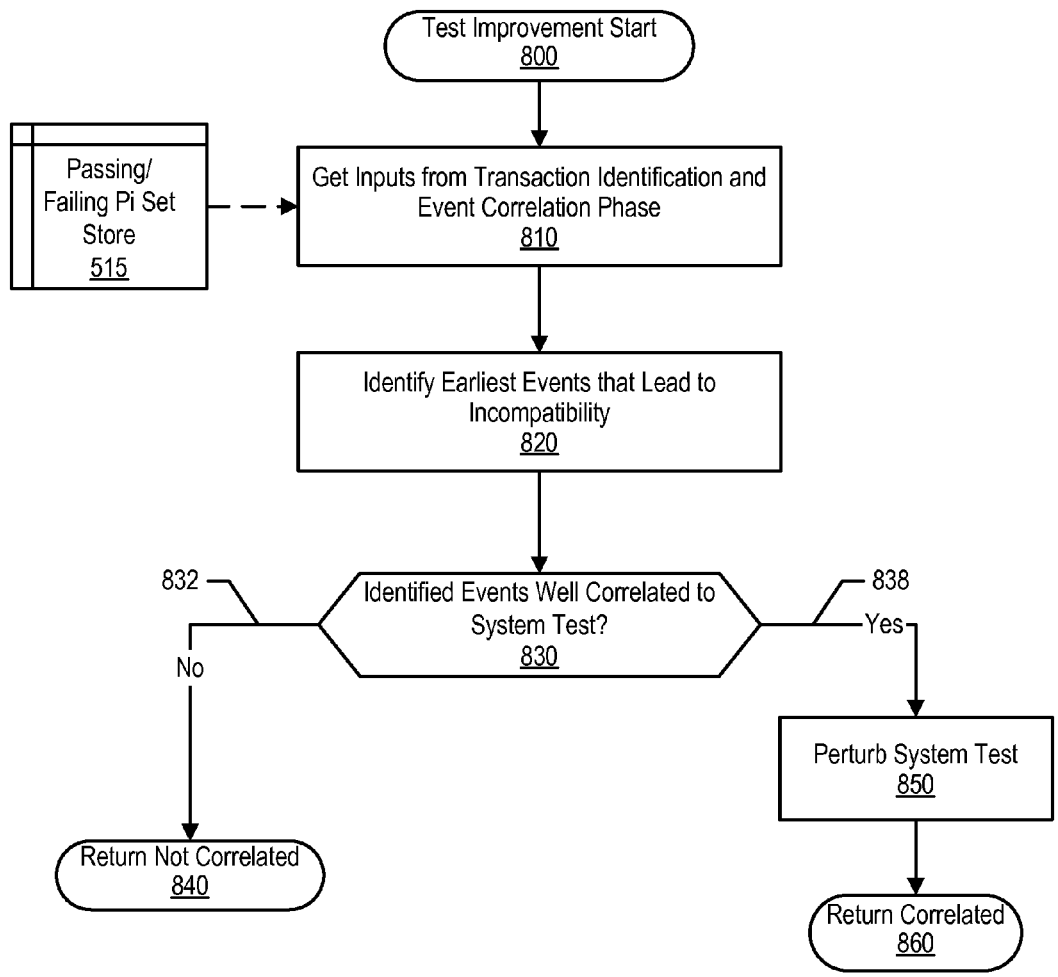
FIG. 8 is a flowchart example showing steps taken in using an identified cause of an intermittent failure to improve an asynchronous device test program.
Figure 11:
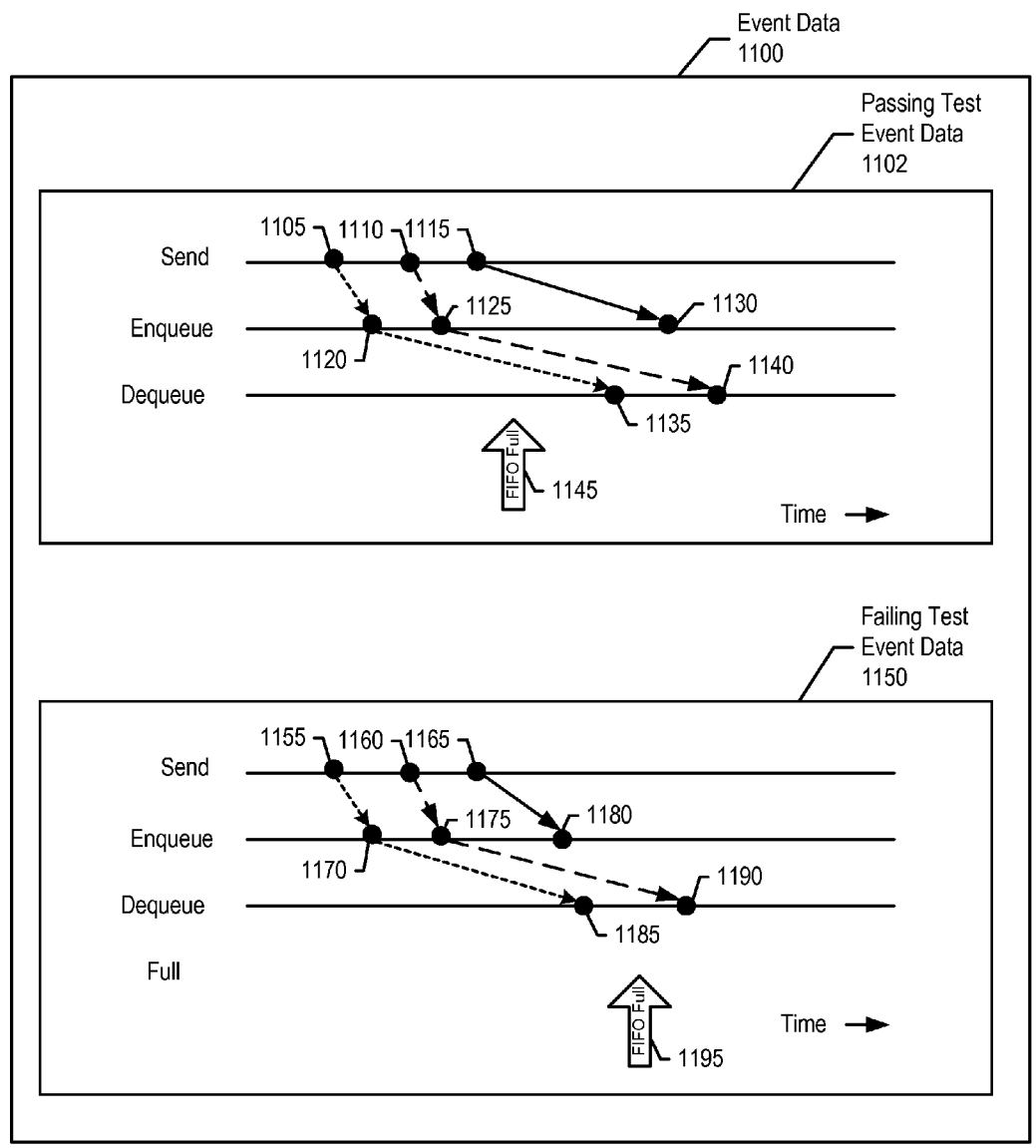
FIG. 11 is a diagram example showing asynchronous transactions occurring during a test program that produce a passing test or a failing test based upon when the transactions' events occur in time relative to each other.

FIG. 8 is a flowchart example showing steps taken in using an identified cause of an intermittent asynchronous failure to improve a device test program. Processing commences at 800, whereupon the test system retrieves an event pair that exhibits an incompatibility between a passing and a failing subsequence (step 810) (See FIGS. 5-7 and corresponding text for further details). Next, the test system identifies the earliest events that lead to an incompatibility at step 820. Referring to FIG. 11, a write opcode in a test causes a "send" to occur, which in turn causes an enqueue. Similarly, a read opcode causes a "receive" to occur, which in turn causes a dequeue. A failure may occur if the $3^{rd}$ enqueue (1180) occurs before the first dequeue (1185). As such, the earliest events that lead to this incompatibility are thus the third write (1165, 1180) and the first read (1155, 1170, 1185).

A determination is made as to whether the identified events are well correlated to the device test program (decision 830). If the events are not well correlated, the test program is not able to be modified to catch the intermittent asynchronous failures and, therefore, decision 830 branches to "No" branch 832 whereupon processing returns at 840. On the other hand, if the identified events are well correlated, decision 830 branches to "Yes" branch 838, whereupon the test system perturbs the device test program based upon the identified events that cause to the discrepancy (step 850). Referring to FIG. 11, once event pairs corresponding to the discrepancy are identified as the third enqueue (1130, 1180) and the first dequeue (1135, 1185), a test program may be perturbed to introduce null commands before read operations that lead to the first dequeue. In turn, this causes the FIFO to fill up with enqueue data while dequeue data is delayed, thus causing the failure to occur more frequently without affecting the functionality of the test. Processing returns at 860.

Figure 9:
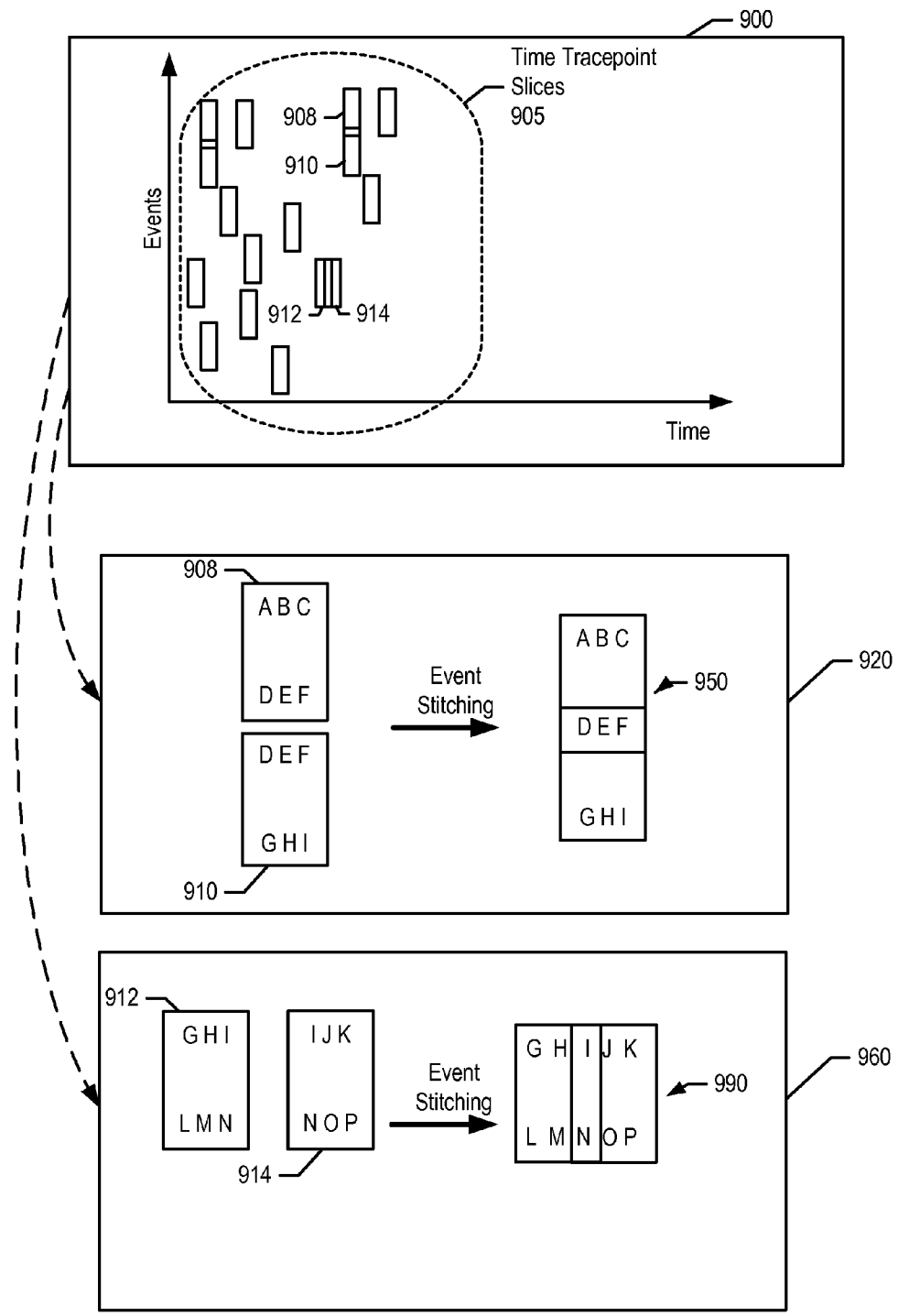
FIG. 9 is a diagram example showing the collection of time-tracepoint slice event data for time-tracepoint slices, and stitching together the time-tracepoint slice event data to create subsequences.

FIG. 9 is a diagram example showing the collection of time-tracepoint slice event data for time-tracepoint slices, and stitching together the time-tracepoint slice event data to create subsequences. As discussed previously, a design monitor may have throughput limitations and, therefore, may be programmed to collect event data for time-tracepoint slices.

Diagram 900 shows an Event-versus-Time graph that includes time-tracepoint slices 905 (individual blocks). Each of the blocks correspond to an event data capture from particular tracepoints at particular timeframes. The example shown in diagram 900 may correspond to a test system at the beginning stages of testing a device and, as the test system continues to test the device, more time-tracepoint slices cover the graph.

Time-tracepoint slices 905 include time-tracepoint slices 908 and 910, which overlap each other on a tracepoint continuum. Likewise, time-tracepoint slices 912 and 914 overlap each other on a time continuum. Diagrams 920 and 940 show these overlapping time-tracepoint slices and their event data being "stitched" together during an event stitching phase of analyzing the event data (see FIG. 4 and corresponding text for further details).

Diagram 920 shows that time-tracepoint slice 908's event data and 910's event data include event data "DEF." Assuming that both time-tracepoint slice 908's event data and 910's event data are from similar test outcomes (passing or failing), time-tracepoint slice 908's event data is merged with time-tracepoint slice 910's event data to create subsequence 950.

Figure 10:
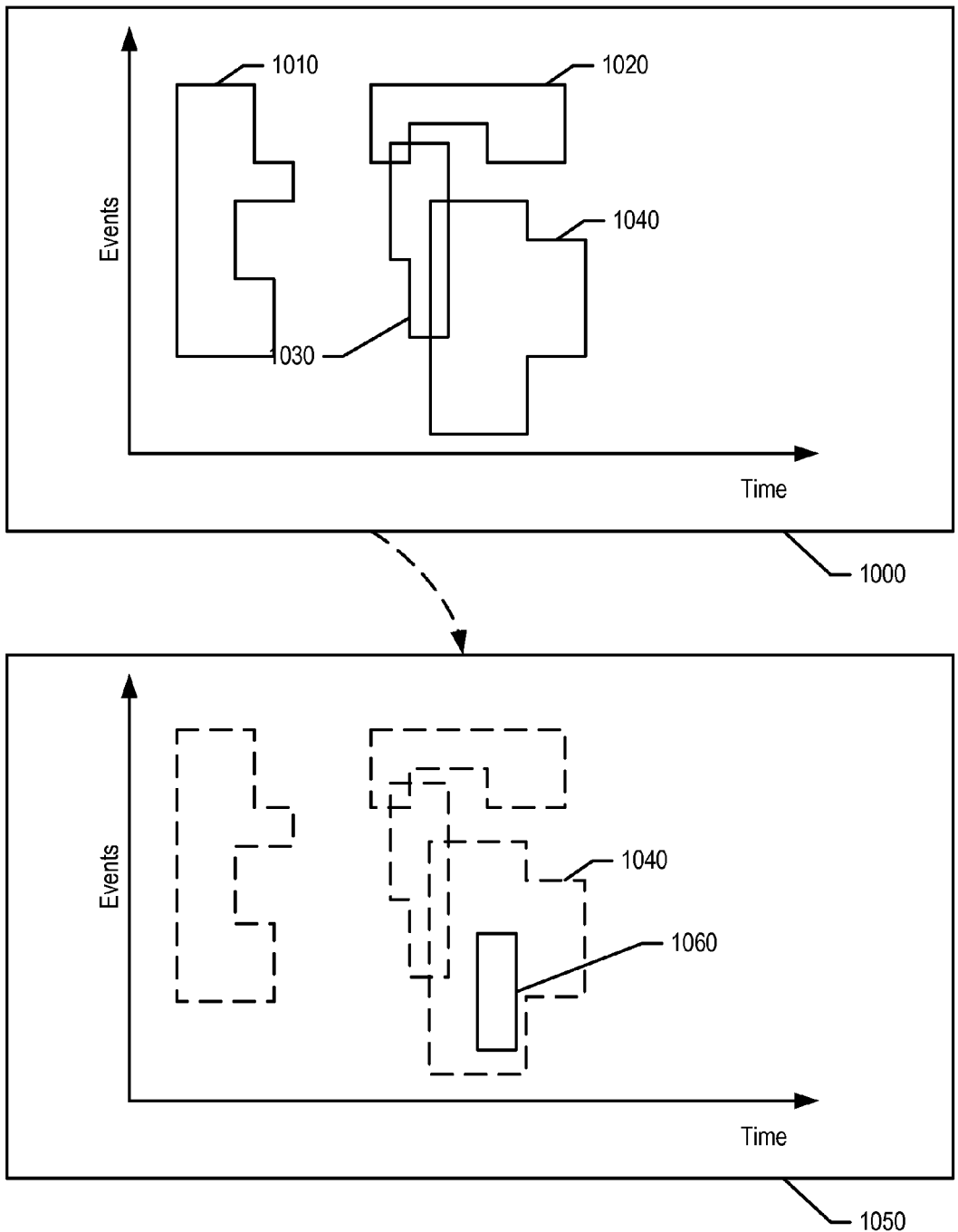
FIG. 10 is a diagram example showing overlap areas between subsequences.

Diagram 960 shows that time-tracepoint slice 912's event data and 914's event data include data "I" and "N." Assuming that both time-tracepoint slice 912's event data and 914's event data are from similar test outcomes (passing or failing), time-tracepoint slice 912's event data is merged with time-tracepoint slice 914's event data to create subsequence 990 (see FIG. 10 and corresponding text for further details).

FIG. 10 is a diagram example showing overlap areas between subsequences. A test system generates subsequences by merging, or stitching, time-tracepoint slice event data together. Time-tracepoint slice event data from a passing test are merged into passing subsequences, and time-tracepoint slice event data from a failing test are merged into failing subsequences. The area at which passing subsequences overlap failing subsequences is the overlap area that a test system further analyzes differences between the passing time-tracepoint slice event data and the failing time-tracepoint slice event data.

Diagram 1000 includes passing subsequences 1010-1040. As can be seen, some subsequences overlap in areas due to their event stitching nature. For example, the overlap area between subsequence 1030 and subsequence 1040 includes events that are common to both subsequences. However, since the value of the event data is different in those subsequences, subsequences 1030 and 1040 are not merged together.

Diagram 1050 shows outlines of passing subsequences 1010-1040 and how they compare with failing subsequence 1060. As discussed above, failing subsequence 1060 is generated by merging time-tracepoint slice event data that correspond to a test that failed. Once a test system identifies the overlap between passing subsequence 1040 and failing subsequence 1060, the test system analyzes the difference, from a timing perspective, between events associated with a passing test and events associated with a failing test (see FIG. 11 and corresponding text for further details).

FIG. 11 is a diagram example showing asynchronous transactions occurring during a test program that produce a passing test or a failing test based upon timing differences between passing transactions relative to each other compared with failing transactions relative to each other. A test system identifies an area where a passing subsequence and failing subsequence overlap (FIG. 10). The test system analyzes events corresponding to the overlap area, and assigns events that are "linked" to each to a transaction (see FIG. 5 and corresponding text for further details).

Event data 1100 includes passing test event data 1102, which shows three transactions. The first transaction includes events 1105, 1120, and 1135. The second transaction includes events 1110, 1125, and 1140. And, the third transaction includes events 1115 and 1130. Although not included in passing test event data 1102, FIFO full arrow 1145 shows when FIFO 210 is full and when a properly functioning full signal 265 should activate. As can be seen, event 1130 is delayed somewhat in order for FIFO 210 to make space for more data.

Failing test event data 1150 includes three similar transactions comprising events 1155-1190, but the time at which certain events occur relative to each other are different than passing test event data 1102's transactions. In contrast to passing test event data 1102, failing test event data 1150 shows event 1180 occurring before events 1185 and 1190. This is due to the fact that, although not included in failing test event data 1150, FIFO full arrow 1195 shows a non-functioning full signal 265 activating later in time relative to FIFO full arrow 1145 shown in passing test event data 1102, resulting in event 1180 being sent to FIFO 210 when FIFO 210 is full. As such, data corresponding to event 1180 may be lost, thus causing a failure.

By identifying the timing differences between the three transactions as discussed above, a test engineer is able to develop a test to screen out devices that exhibit this condition. In addition, a design engineer may add a gate (buffer) to the device's design in order to eliminate the race condition altogether.

Figure 12:
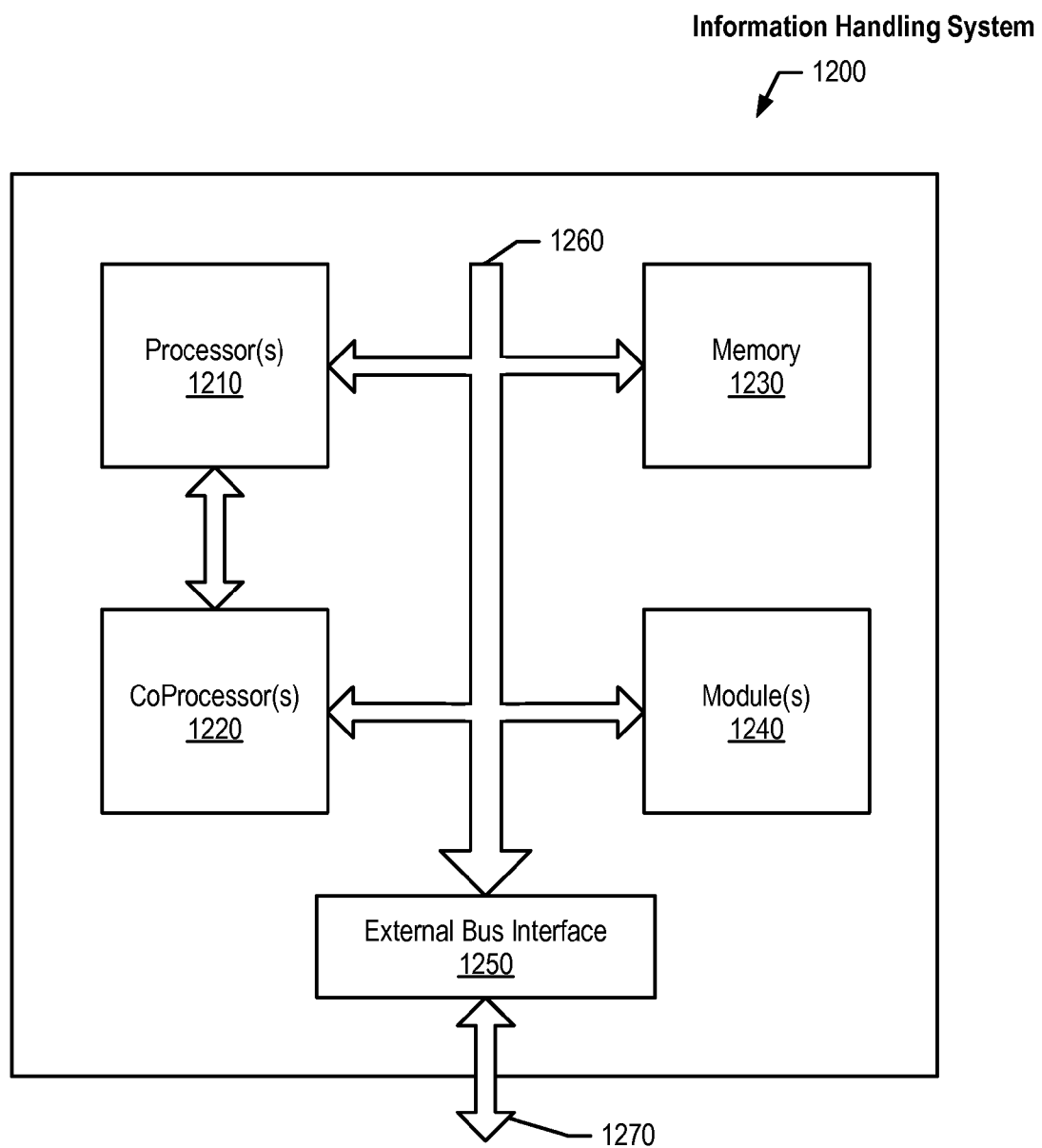
FIG. 12 illustrates an information handling system, which is a simplified example of a test system or computer system capable of performing the computing operations described herein.

FIG. 12 illustrates information handling system 1200, which is a simplified example of a test system or computer system capable of performing the computing operations described herein, such as test system 175 or computer system 195 shown in FIG. 1. Information handling system 1200 includes processor(s) 1210, co-processor(s) 1220, memory 1230, module(s) 1240, and external bus interface 1250, which are all bi-directionally coupled by way of bus 1260. Information handling system 1200 may couple to external systems by way of external bus 1270, such as a USB bus, an Ethernet bus, and etcetera. For example, information handling system 1200 may represent computer system 195 that couples to external test system 175 via external bus 1270.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
utilizing a processor to merge passing event data into a passing subsequence, the passing event data being collected in a device when the device executes a test program and yields a pass result;
utilizing the processor to merge failing event data into a failing subsequence, the failing event data being collected in the device when the device executes the test program and yields a fail result;
identifying an overlap area between the passing subsequence and the failing subsequence;
creating a first passing transaction and a second passing transaction using a subset of the passing event data included in the overlap area;
creating a first failing transaction and a second failing transaction using a subset of the failing event data included in the overlap area;
detecting a timing order discrepancy between the first passing transaction relative to the second passing transaction compared with the first failing transaction relative to the second failing transaction; and
reporting the detected timing order discrepancy.

2. The computer-implemented method of claim 1 wherein the test program executes for a total execution time, the method further comprising:
defining a plurality of time-tracepoint slices, wherein each of the plurality of time-tracepoint slices identifies a time slice and a tracepoint slice, the time slice corresponding to a subset of time of the total execution time and the tracepoint slice corresponding to a subset of a plurality of tracepoints, each of the plurality of tracepoints corresponding to a location on the device for which to collect the passing event data and the failing event data.

3. The computer-implemented method of claim 2 further comprising:
selecting one of the plurality of time-tracepoint slices;
executing the test program while collecting time-tracepoint slice event data that corresponds to the selected time-tracepoint slice;
merging the collected time-tracepoint slice event data with the passing subsequence in response to determining that that the test program yielded the pass result and that the collected time-tracepoint slice event data meets one or more thresholds when compared with the passing subsequence; and
merging the collected time-tracepoint slice event data with the failing subsequence in response to determining that that the test program yielded the fail result and that the collected time-tracepoint slice event data meets one or more of the thresholds when compared with the failing subsequence.

4. The computer-implemented method of claim 1 wherein the creating of the first passing transaction further comprises:
identifying a plurality of passing events from the subset of passing event data;
listing the plurality of passing events in temporal order;
selecting one of the plurality of passing events;
calculating a temporal congruence between the selected passing event and the first transaction;
comparing the calculated temporal congruence with a temporal congruence threshold;
assigning the passing event to the first transaction in response to the calculated temporal congruence meeting the temporal congruence threshold; and creating a new transaction using the selected passing event in response to the calculated temporal congruence failing to meet the temporal congruence threshold.

5. The computer-implemented method of claim 4 further comprising:
calculating an address/data congruence between the selected passing event and the first transaction;
comparing the address/data congruence with an address/data congruence threshold; and
creating a new transaction using the selected passing event in response to the calculated address/data congruence failing to meet the address/data congruence threshold.

6. The computer-implemented method of claim 1 wherein the creating of the first failing transaction further comprises:
identifying a plurality of failing events from the subset of failing event data;
listing the plurality of failing events in temporal order;
selecting one of the plurality of failing events;
calculating a temporal congruence between the selected failing event and the first transaction;
comparing the calculated temporal congruence with a temporal congruence threshold;
assigning the failing event to the first transaction in response to the calculated temporal congruence meeting the temporal congruence threshold; and
creating a new transaction using the selected failing event in response to the calculated temporal congruence failing to meet the temporal congruence threshold.

7. The computer-implemented method of claim 6 further comprising:
calculating an address/data congruence between the selected failing event and the first transaction;
comparing the address/data congruence with an address/data congruence threshold; and
creating a new transaction using the selected failing event in response to the calculated address/data congruence failing to meet the address/data congruence threshold.

8. The computer-implemented method of claim 1 further comprising:
replacing the first passing transaction with passing temporal signature events in response to detecting that the first passing transaction includes a number of passing events that exceeds an event number threshold; and
replacing the first failing transaction with failing temporal signature events in response to detecting that the first failing transaction includes a number of failing events that exceeds the event number threshold.

9. The computer-implemented method of claim 1 further comprising:
identifying, from the subset of failing event data, a failing event pair that includes a first failing event and a second failing event;
including the failing event pair in a failing Pi set in response to determining that the first failing event and the second failing event are not included in a same transaction;
identifying, from the subset of passing event data, a passing event pair that includes a first passing event and a second passing event;
including the passing event pair in a passing Pi set in response to determining that the first passing event and the second passing event are not included in a same transaction; and
using the failing Pi set and the passing Pi set for detecting the timing order discrepancy.

10. The computer-implemented method of claim 1 further comprising:
perturbing the test program in response to detecting the timing difference; and
executing the perturbed test program on the device.

11. A system comprising:
one or more processors;
a memory accessible by at least one of the processors;
a nonvolatile storage area accessible by at least one of the processors;
a set of instructions stored in the memory and executed by at least one of the processors in order to perform actions of:
merging passing event data into a passing subsequence, the passing event data being collected in a device when the device executes a test program and yields a pass result;
merging failing event data into a failing subsequence, the failing event data being collected in the device when the device executes the test program and yields a fail result;
identifying an overlap area between the passing subsequence and the failing subsequence;
creating a first passing transaction and a second passing transaction using a subset of the passing event data included in the overlap area;
creating a first failing transaction and a second failing transaction using a subset of the failing event data included in the overlap area;
detecting a timing order discrepancy between the first passing transaction relative to the second passing transaction compared with the first failing transaction relative to the second failing transaction; and
reporting the detected timing order discrepancy.

12. The system of claim 11 wherein the test program executes for a total execution time, the set of instructions further performing actions of:
defining a plurality of time-tracepoint slices, wherein each of the plurality of time-tracepoint slices identifies a time slice and a tracepoint slice, the time slice corresponding to a subset of time of the total execution time and the tracepoint slice corresponding to a subset of a plurality of tracepoints, each of the plurality of tracepoints corresponding to a location on the device for which to collect the passing event data and the failing event data;
selecting one of the plurality of time-tracepoint slices;
executing the test program while collecting time-tracepoint slice event data that corresponds to the selected time-tracepoint slice;
merging the collected time-tracepoint slice event data with the passing subsequence in response to determining that that the test program yielded the pass result and that the collected time-tracepoint slice event data meets one or more thresholds when compared with the passing subsequence; and
merging the collected time-tracepoint slice event data with the failing subsequence in response to determining that that the test program yielded the fail result and that the collected time-tracepoint slice event data meets one or more of the thresholds when compared with the failing subsequence.

13. The system of claim 11 wherein the set of instructions further performs actions of:
identifying a plurality of passing events from the subset of passing event data;
listing the plurality of passing events in temporal order;
selecting one of the plurality of passing events;
calculating a temporal congruence between the selected passing event and the first transaction;

comparing the calculated temporal congruence with a temporal congruence threshold;
calculating an address/data congruence between the selected passing event and the first transaction;
comparing the address/data congruence with an address/data congruence threshold;
assigning the passing event to the first transaction in response to the calculated temporal congruence meeting the temporal congruence threshold and the address/data congruence meeting the address/data congruence threshold; and
creating a new transaction using the selected passing event in response to the calculated temporal congruence failing to meet the temporal congruence threshold or the address/data congruence failing to meet the address/data congruence threshold.

14. The system of claim 11 wherein the set of instructions further performs actions of:
identifying a plurality of failing events from the subset of failing event data;
listing the plurality of failing events in temporal order;
selecting one of the plurality of failing events;
calculating a temporal congruence between the selected failing event and the first transaction;
comparing the calculated temporal congruence with a temporal congruence threshold;
calculating an address/data congruence between the selected failing event and the first transaction;
comparing the address/data congruence with an address/data congruence threshold;
assigning the failing event to the first transaction in response to the calculated temporal congruence meeting the temporal congruence threshold and the address/data congruence meeting the address/data congruence threshold; and
creating a new transaction using the selected failing event in response to the calculated temporal congruence failing to meet the temporal congruence threshold or the address/data congruence failing to meet the address/data congruence threshold.

15. The system of claim 11 wherein the set of instructions further performs actions of:
identifying, from the subset of failing event data, a failing event pair that includes a first failing event and a second failing event;
including the failing event pair in a failing Pi set in response to determining that the first failing event and the second failing event are not included in a same transaction;
identifying, from the subset of passing event data, a passing event pair that includes a first passing event and a second passing event;
including the passing event pair in a passing Pi set in response to determining that the first passing event and the second passing event are not included in a same transaction; and
using the failing Pi set and the passing Pi set for detecting the timing order discrepancy.

16. A computer program product stored in a computer readable storage device, comprising functional descriptive material that, when executed by an information handling system, causes the information handling system to perform actions that include:
merging passing event data into a passing subsequence, the passing event data being collected in a device when the device executes a test program and yields a pass result;
merging failing event data into a failing subsequence, the failing event data being collected in the device when the device executes the test program and yields a fail result;
identifying an overlap area between the passing subsequence and the failing subsequence;
creating a first passing transaction and a second passing transaction using a subset of the passing event data included in the overlap area;
creating a first failing transaction and a second failing transaction using a subset of the failing event data included in the overlap area;
detecting a timing order discrepancy between the first passing transaction relative to the second passing transaction compared with the first failing transaction relative to the second failing transaction; and
reporting the detected timing order discrepancy.

17. The computer program product of claim 16 wherein the test program executes for a total execution time, the information handling system further performing actions of:
defining a plurality of time-tracepoint slices, wherein each of the plurality of time-tracepoint slices identifies a time slice and a tracepoint slice, the time slice corresponding to a subset of time of the total execution time and the tracepoint slice corresponding to a subset of a plurality of tracepoints, each of the plurality of tracepoints corresponding to a location on the device for which to collect the passing event data and the failing event data;
selecting one of the plurality of time-tracepoint slices;
executing the test program while collecting time-tracepoint slice event data that corresponds to the selected time-tracepoint slice;
merging the collected time-tracepoint slice event data with the passing subsequence in response to determining that that the test program yielded the pass result and that the collected time-tracepoint slice event data meets one or more thresholds when compared with the passing subsequence; and
merging the collected time-tracepoint slice event data with the failing subsequence in response to determining that that the test program yielded the fail result and that the collected time-tracepoint slice event data meets one or more of the thresholds when compared with the failing subsequence.

18. The computer program product of claim 16 wherein the information handling system further performs actions of:
identifying a plurality of passing events from the subset of passing event data;
listing the plurality of passing events in temporal order;
selecting one of the plurality of passing events;
calculating a temporal congruence between the selected passing event and the first transaction;
comparing the calculated temporal congruence with a temporal congruence threshold;
calculating an address/data congruence between the selected passing event and the first transaction;
comparing the address/data congruence with an address/data congruence threshold;
assigning the passing event to the first transaction in response to the calculated temporal congruence meeting the temporal congruence threshold and the address/data congruence meeting the address/data congruence threshold; and
creating a new transaction using the selected passing event in response to the calculated temporal congruence failing to meet the temporal congruence threshold or the address/data congruence failing to meet the address/data congruence threshold.

19. The computer program product of claim 16 wherein the information handling system further performs actions of:
- identifying a plurality of failing events from the subset of failing event data;
- listing the plurality of failing events in temporal order;
- selecting one of the plurality of failing events;
- calculating a temporal congruence between the selected failing event and the first transaction;
- comparing the calculated temporal congruence with a temporal congruence threshold;
- calculating an address/data congruence between the selected failing event and the first transaction;
- comparing the address/data congruence with an address/data congruence threshold;
- assigning the failing event to the first transaction in response to the calculated temporal congruence meeting the temporal congruence threshold and the address/data congruence meeting the address/data congruence threshold; and
- creating a new transaction using the selected failing event in response to the calculated temporal congruence failing to meet the temporal congruence threshold or the address/data congruence failing to meet the address/data congruence threshold.

20. The computer program product of claim 16 wherein the information handling system further performs actions of:
- identifying, from the subset of failing event data, a failing event pair that includes a first failing event and a second failing event;
- including the failing event pair in a failing Pi set in response to determining that the first failing event and the second failing event are not included in a same transaction;
- identifying, from the subset of passing event data, a passing event pair that includes a first passing event and a second passing event;
- including the passing event pair in a passing Pi set in response to determining that the first passing event and the second passing event are not included in a same transaction; and
- using the failing Pi set and the passing Pi set for detecting the timing order discrepancy.

* * * * *